United States Patent
Peng et al.

(10) Patent No.: US 11,953,964 B2
(45) Date of Patent: Apr. 9, 2024

(54) ETHERNET POWER SUPPLY AND POWER SAVING METHOD OF CONTROLLING THE SAME

(71) Applicant: DELTA ELECTRONICS, INC., Taoyuan (TW)

(72) Inventors: Yung-Wei Peng, Taoyuan (TW); Kuan-Hsien Tu, Taoyuan (TW); Cheng-En Liu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 51 days.

(21) Appl. No.: 17/831,060

(22) Filed: Jun. 2, 2022

(65) Prior Publication Data

US 2023/0180450 A1 Jun. 8, 2023

(30) Foreign Application Priority Data

Dec. 8, 2021 (CN) .......................... 202111493048.7

(51) Int. Cl.
*G06F 1/32* (2019.01)
*G06F 1/3209* (2019.01)

(52) U.S. Cl.
CPC .................................. *G06F 1/3209* (2013.01)

(58) Field of Classification Search
CPC ...................................................... G06F 1/3209
See application file for complete search history.

(56) References Cited

U.S. PATENT DOCUMENTS

| 8,392,964 | B2 * | 3/2013 | Diab ................... H04L 63/0876 726/36 |
| 9,377,794 | B1 * | 6/2016 | Dwelley ................. G05F 1/462 |
| 2017/0322610 | A1 * | 11/2017 | Hansalia ................. G06F 1/266 |

* cited by examiner

*Primary Examiner* — Stefan Stoynov
(74) *Attorney, Agent, or Firm* — MUNCY, GEISSLER, OLDS & LOWE, P.C.

(57) ABSTRACT

An Ethernet power supply receives a DC voltage through a bus positive terminal and a bus negative terminal, and is coupled to a load device. The Ethernet power supply includes a first control module and a second control module. The first control module provides a first control signal through the bus negative terminal to confirm whether the load device is a valid load. The second control module is used to connect or disconnect a coupling relationship between the bus positive terminal and the first control module according to whether the load device is connected to the Ethernet power supply.

22 Claims, 6 Drawing Sheets

ETHERNET POWER SUPPLY AND POWER SAVING METHOD OF CONTROLLING THE SAME

BACKGROUND

Technical Field

The present disclosure relates to an Ethernet power supply and a method of controlling the same, and more particularly to an Ethernet power supply and a power saving method of controlling the same.

Description of Related Art

The statements in this section merely provide background information related to the present disclosure and do not necessarily constitute prior art.

Since most of the power source equipment (PSE) currently on the market are communicated with the power devices (i.e., the loads) by using a specific control signal to determine whether the PSE should supply power to the correct (matched) PD, even if the PD is not connected, the PSE will continuously send the specific control signal for detection, resulting in power loss. Therefore, the current Ethernet power supply cannot meet the requirements of the current energy efficiency standards (for example, DoE, EC CoC, etc.), and the schematic diagram of the circuit structure is shown in FIG. 1.

When this circuit design realizes full-time communication through the specific control signal, even if the PD has been removed (disconnected), the controller PSE controller of the power supply will continuously send the specific control signal, this results in no-load power consumption that cannot meet the specifications of the current energy efficiency standards (for example, DoE, EC CoC, etc.).

SUMMARY

In order to solve the above-mentioned problems, the present disclosure provides an Ethernet power supply. The Ethernet power supply is coupled to a positive end and a negative end of a load device through a bus positive terminal and a bus negative terminal, and receives a DC voltage. The Ethernet power supply includes a first control module and a second control module. The first control module includes a power terminal, and a first end of the first control module is coupled to the bus negative terminal, and controls the power supplied by the Ethernet power supply to the load device. The second control module is coupled to the first control module, the bus positive terminal, and the bus negative terminal. The second control module includes a path control circuit, a first control unit, and a second control unit. The path control circuit connects or disconnects a coupling relationship between the power terminal and the bus positive terminal. The first control unit is coupled to the bus negative terminal and the path control circuit, and turns on the path control circuit according to a first control signal corresponding to a temporary connection phase when the negative end is connected to the bus negative terminal. The second control unit is coupled to the first control module and the path control circuit, and turns on the path control circuit according to a second control signal provided by the first control module. The bus negative terminal provides the first control signal when the negative end is connected to or disconnected from the bus negative terminal. The first control module provides the second control signal. The second control module turns off the path control circuit when the negative end is disconnected from the bus negative terminal; the first control module is powered on to work when the path control circuit is turned on, and is powered off to rest when the path control circuit is turned off.

In order to solve the above-mentioned problems, the present disclosure provides an Ethernet power supply. The Ethernet power supply is coupled to a positive end and a negative end of a load device through a bus positive terminal and a bus negative terminal, and receives a DC voltage. The Ethernet power supply includes a first control module and a second control module. The first control module includes a power terminal, and a first end of the first control module is coupled to the bus negative terminal, and controls the power supplied by the Ethernet power supply to the load device. The second control module is coupled to the first control module, the bus positive terminal, and the bus negative terminal. The second control module includes a path control circuit, a first control unit, and a second control unit. The path control circuit connects or disconnects a coupling relationship between the power terminal and the bus positive terminal. The first control unit is coupled to the bus negative terminal and the path control circuit, and provides a first valid control signal to drive the path control circuit from a turned-off state to a turned-on state when the negative end is connected to the bus negative terminal, and the first control module is correspondingly powered on to work. The second control unit is coupled to the first control module and the path control circuit, and provides a second invalid control signal to drive the path control circuit from the turned-on state to the turned-off state when the negative end is disconnected from the bus negative terminal, and the first control module be correspondingly powered off to rest. When the first control module is powered on to work, the first control module controls the second control unit to provide the second invalid control signal when the negative end is disconnected from the bus negative terminal.

In order to solve the above-mentioned problems, the present disclosure provides a power saving method of controlling an Ethernet power supply. The Ethernet power supply receives a DC voltage, and is coupled to a positive end and a negative end of a load device. The Ethernet power supply includes a first control module, and the first control module receives the DC voltage through a bus positive terminal and a bus negative terminal, and the first control module is coupled to the negative end through the bus negative terminal and configured to provide a first control signal through the bus negative terminal to confirm whether the load device is a valid load. The power saving method includes steps of: turning on or turning off a path control circuit between a power terminal of the first control module and the bus positive terminal by detecting whether the load device is connected to the Ethernet power supply, turning on the path control circuit by a first control unit when the negative end is connected to the bus negative terminal, turning on the path control circuit by a second control unit when the bus negative terminal is grounded, and turning off the path control circuit when the negative end is disconnected from the bus negative terminal.

The main purpose and effect of the present disclosure is that the Ethernet power supply detects whether the load device is connected to the Ethernet power supply so as to determine whether to supply power to the first control module and make the first control module operate. When the load device is not connected (inserted) to the Ethernet power supply, the second control module controls the first control module to be powered off and stop working so as to save the power consumption of the Ethernet power supply and comply with the energy efficiency standards.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
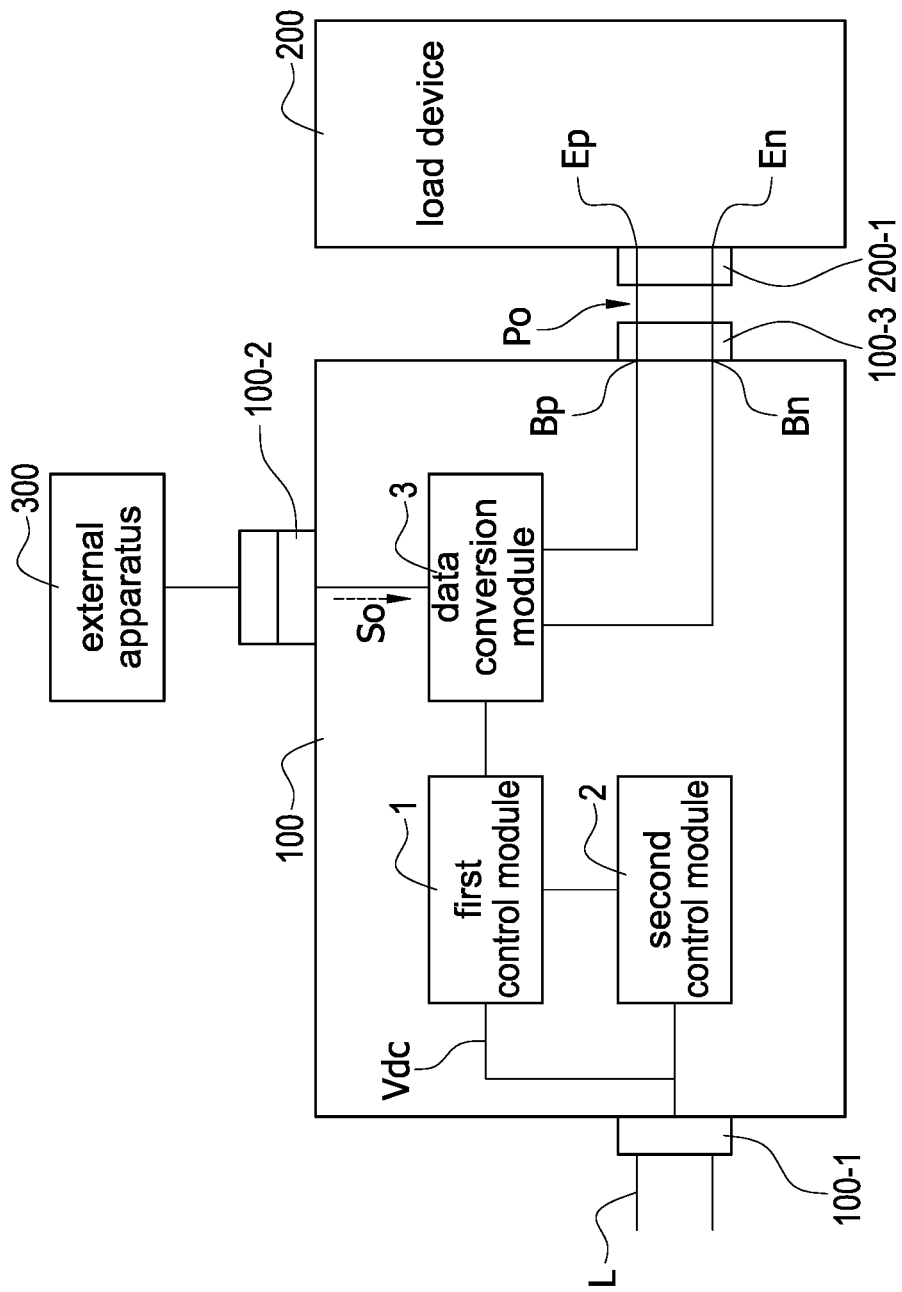
FIG. 1 is a block diagram of an Ethernet power supply with a power saving function according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block diagram of an Ethernet power supply with a power saving function according to the present disclosure. The Ethernet power supply 100 is used to provide a DC voltage Vdc to a load device 200 for supplying power to the load device 200. In particular, the DC voltage Vdc, for example, but not limited to, may be 20 volts to 55 volts, depending on the specifications of the Ethernet power supply 100. The Ethernet power supply 100 includes a first control module 1, a second control module 2, and a data conversion module 3. The first control module 1 is coupled to the second control module 2 and the data conversion module 3. The first control module 1 is coupled to a power wire L through a first port 100-1, and the first control module 1 operates by receiving the DC voltage Vdc provided from the power wire L through the bus positive terminal Bp and the bus negative terminal Bn. The data conversion module 3 is coupled to an external apparatus 300 through a second port 100-2 to receive an external signal So provided by the external apparatus 300. In particular, the external apparatus 300 is, for example, but not limited to, a web camera, or a central server.

Specifically, the main purpose and effect of the present disclosure is that the Ethernet power supply 100 detects whether the load device 200 is connected to the Ethernet power supply 100 so as to determine whether to supply power to the first control module 1 and make the first control module 1 operate. When the load device 200 is not connected (inserted) to the Ethernet power supply 100, the second control module 2 controls the first control module 1 to be powered off and stop working so as to save the power consumption of the Ethernet power supply 100 and comply with the energy efficiency standards (for example, DoE, EC CoC, MEPS, Tier, etc.). When the load device 200 is connected (inserted) to the Ethernet power supply 100, the second control module 2 controls the first control module 1 being powered on to work so that the first control module 1 controls the Ethernet power supply 100 supplying the required power to the load device 200.

Figure 2:
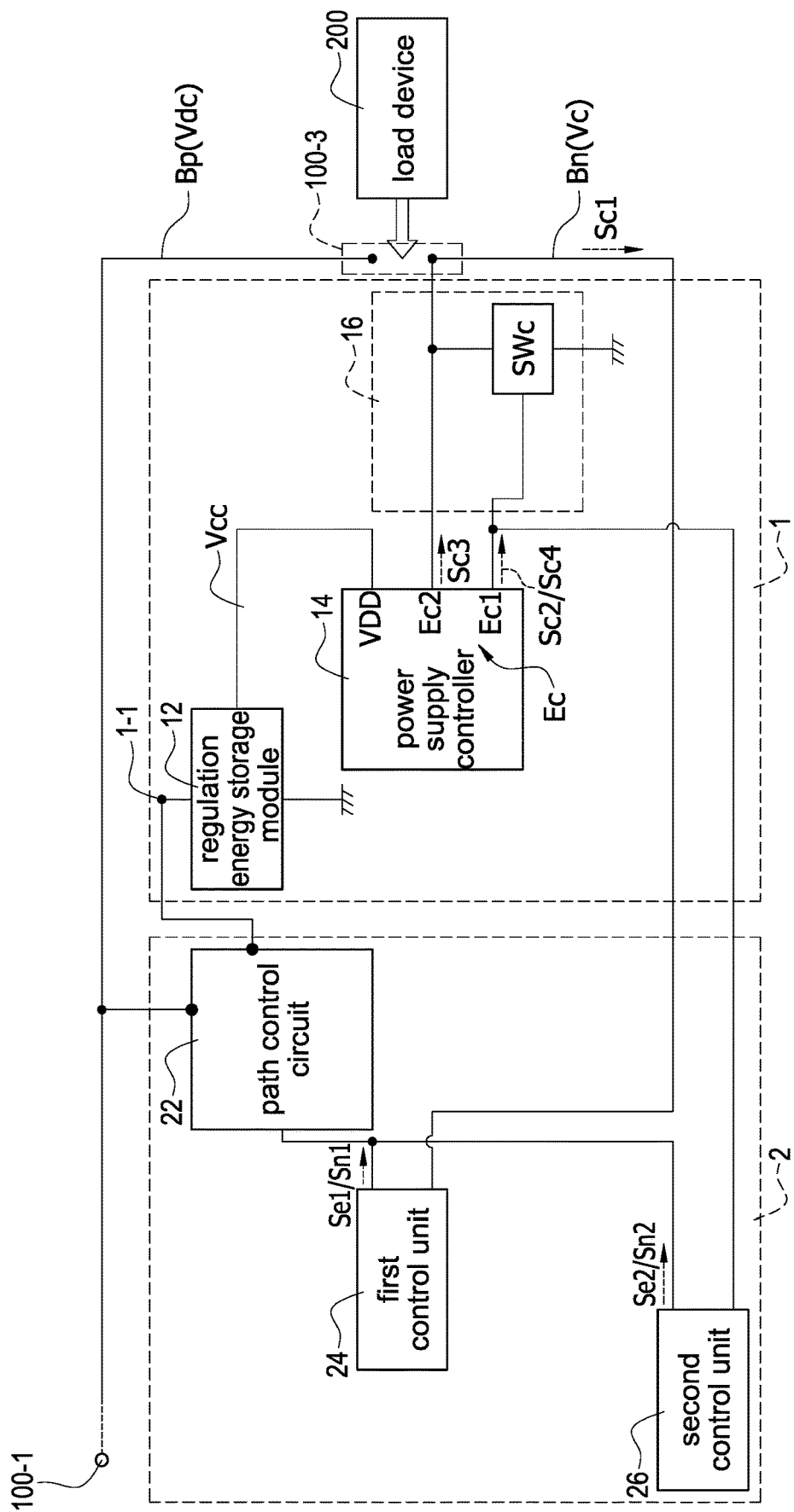
FIG. 2 is a detailed block diagram of the Ethernet power supply with a power saving function according to the present disclosure.

Please refer to FIG. 2, which shows a detailed block diagram of the Ethernet power supply with a power saving function according to the present disclosure, and also refer to FIG. 1. The first control module 1 includes a power terminal 1-1, and a first end of the first control module 1 is coupled to the bus negative terminal Bn, and the first control module 1 is used to control the power supplied by the Ethernet power supply 100 to the load device 200. The second control module 2 includes a path control circuit 22, a first control unit 24, and a second control unit 26. The bus negative terminal Bn provides (outputs) a first control signal Sc1 according to a negative end En of the load device 200 connected to or disconnected (removed) from the bus negative terminal Bn. In particular, the first control signal Sc1 may be, but not limited to, the terminal voltage Vc of the bus negative terminal Bn. The path control circuit 22 is coupled to the power terminal 1-1 of the first control module 1 and the bus positive terminal Bp, and is used to connect or disconnect the coupling relationship between the power terminal 1-1 and the bus positive terminal Bp. The first control unit 24 is coupled to the bus negative terminal Bn and the path control circuit 22, and is used to turn on the path control circuit 22 according to the first control signal Sc1 provided from the bus negative terminal Bn. The second control unit 26 is coupled to the first control module 1 and the path control circuit 22, and configured to turn on the path control circuit 22 according to the second signal Sc2 provided from the first control module 1.

Specifically, when the load device 200 is not connected to (disconnected from) the Ethernet power supply 100, i.e., the negative end En is not connected to the bus negative terminal Bn, the terminal voltage Vc corresponding to the first control signal Sc1 provided by from the bus negative terminal Bn is at a condition (state) that the negative end En is not connected to the bus negative terminal Bn and the bus negative terminal Bn is not grounded. In this condition, the first control module 1 is powered off to stop working and cannot provide the second control signal Sc2. Therefore, the first control unit 24 and the second control unit 26 respectively control the path control circuit 22 to disconnect the coupling relationship between the power terminal 1-1 and the bus positive terminal Bp according to the states of the first control signal Sc1 and the second control signal Sc2.

Moreover, when the load device 200 is connected to the Ethernet power supply 100, i.e., the negative end En is connected to the bus negative terminal Bn, a temporary loop is formed (that is, the loop is temporarily formed due to the connection between the load device 200 and the Ethernet power supply 100) between the Ethernet power supply 100 and the load device 200 through the first port 100-1, the bus positive terminal Bp, the load device 200, and the bus negative terminal Bn so that a terminal voltage Vc of the bus negative terminal Bn is increased and the terminal voltage Vc is used as the first control signal Sc1 to be provided to the first control unit 24. The first control unit 24 provides a first valid control signal Se1 to the path control circuit 22 according to the first control signal Sc1 in the temporary connection phase. Also, in the temporary connection phase, the second control unit 26 provides a second invalid control signal Sn2 to the path control circuit 22 according to the first control module 1 be still powered off and stop working. Therefore, the path control circuit 22 is turned on by the first valid control signal Se1 to make the power terminal 1-1 and the bus positive terminal Bp be electrically coupled so that the first control module 1 receives a supplying voltage Vcc (or the DC voltage Vdc) to be powered on to work through the path control circuit 22.

In the temporary connection phase and the first control module 1 be powered on to work, the first control module 1 starts to provide a third control signal Sc3 to communicate with the load device 200 by a handshaking process (manner) through the bus negative terminal Bn and the negative end En, and therefore the state of supplying power to the load device 200 from the Ethernet power supply 100 is controlled according to the result of the handshaking communication. The handshaking communication between the first control module 1 and the load device 200 includes determining whether the load device 200 is a valid (available) load or an invalid (unavailable) load. When the load device 200 is determined to be the valid load, the first control module 1 controls the Ethernet power supply 100 to supply power to the load device 200 to depart from the temporary connection phase to enter to a power supply phase. When the load device 200 is determined to be the invalid load, the first control module 1 controls the Ethernet power supply 100 to stop supplying power to the load device 200 to depart from the power supply phase to enter to a no-power supply phase.

Please refer to FIG. 1 and FIG. 2, in another embodiment, the first control module 1 includes a regulation energy storage module 12, a power supply controller 14, and a communication module 16. The regulation energy storage module 12 is coupled to the second control module 2 through a power terminal 1-1. The regulation energy storage module 12 is, for example, but not limited to, a voltage regulation circuit, an energy storage component, a converter, and other components or circuits that have functions of voltage regulation, energy storage, or power conversion. The power supply controller 14 has a power pin VDD and a communication terminal Ec. The power pin VDD is coupled to the power terminal 1-1 through the regulation energy storage module 12, and the communication terminal Ec is coupled to the second control module 2 and the communication module 16. The communication terminal Ec has a first pin Ec1 and a second pin Ec2. The first pin Ec1 is coupled to the second control unit 26, and the second pin Ec2 is coupled to the bus negative terminal Bn through the communication module 16. When the power supply controller 14 operates (in a working status), the first pin Ec1 provides the second control signal Sc2 and the second pin Ec2 provides the third control signal Sc3 to perform corresponding controls.

The regulation energy storage module 12 is used to store the DC voltage Vdc as a power supply voltage Vcc which is stable for providing the required power to the power supply controller 14 to be powered on and worked. In particular, if the power supply controller 14 may directly use the DC voltage Vdc to work, the regulation energy storage module 12 can also be omitted.

In the second control module 2, the first control unit 24 is coupled to the bus negative terminal Bn and a control end of the path control circuit 22, and the second control unit 26 is coupled to the first pin Ec1 of the power supply controller 14 and the control end of the path control circuit 22. The first control unit 24 provides the first valid control signal Se1 to the path control circuit 22 according to the first control signal Sc1 in the temporary connection phase by connecting the negative end En to the bus negative terminal Bn so that the path control circuit 22 is used to connect a coupling relationship between the power terminal 1-1 and the bus positive terminal Bp, and the first control module 1 is powered on to work. The powered-on power supply controller 14 provides the third control signal Sc3 through the second pin Ec2 to perform the handshaking communication with the load device 200 by coupling to the bus negative terminal Bn through the communication module 16. Therefore, the power supply controller 14 correspondingly outputs the second control signal Sc2 through the first pin Ec1 according to the result of the handshaking communication. The second control unit 26 provides a second valid control signal Se2 to the path control circuit 22 according to the second control signal Sc2 outputted from the first pin Ec1. The path control circuit 22 is used to connect the coupling relationship between the power terminal 1-1 and the bus positive terminal Bp according to the second valid control signal Se2 so that the power supply controller 14 is still powered on to work. The power supply controller 14 controls the Ethernet power supply 100 to provide the DC voltage Vdc to the load device 200 to make the load device 200 be in the power supply phase. The second control unit 26 provides a second invalid control signal Sn2 to the path control circuit 22 according to the second control signal Sc2 is not outputted from the first pin Ec1. The path control circuit 22 disconnects the coupling relationship between the power terminal 1-1 and the bus positive terminal Bp by the second invalid control signal Sn2 so that the power supply controller 14 is powered off to rest (stop working). The power supply controller 14 controls the Ethernet power supply 100 to stop providing the DC voltage Vdc to the load device 200 to make the load device 200 be in the no-power supply phase.

The second pin Ec2 of the power supply controller 14 provides the third control signal Sc3 to perform the handshaking communication with the load device 200 by coupling to the bus negative terminal Bn through the communication module 16 so as to confirm that the load device 200 is the valid load or the invalid load. The power supply controller 14 outputs the second control signal Sc2 through the first pin Ec1 when the load device 200 is confirmed as the valid load, and the power supply controller 14 outputs a fourth control signal Sc4 through the first pin Ec1 when the load device 200 is confirmed as the invalid load. The second control unit 26 provides the second valid control signal Se2 to the path control circuit 22 according to the second control signal Sc2 outputted from the first pin Ec1. The path control circuit 22 is used to connect the coupling relationship between the power terminal 1-1 and the bus positive terminal Bp according to the second valid control signal Se2 so that the power supply controller 14 is still powered on to work. The power supply controller 14 controls the Ethernet power supply 100 to provide the DC voltage Vdc to the load device 200 to make the load device 200 be in the power supply phase. The second control unit 26 provides a second invalid control signal Sn2 to the path control circuit 22 according to the fourth control signal Sc4 is outputted from the first pin Ec1. The path control circuit 22 disconnects the coupling relationship between the power terminal 1-1 and the bus positive terminal Bp by the second invalid control signal Sn2 so that the power supply controller 14 is powered off to rest (stop working). The power supply controller 14 controls the Ethernet power supply 100 to stop providing the DC voltage Vdc to the load device 200 to make the load device 200 be in the no-power supply phase.

In addition, the power supply controller 14 makes the bus negative terminal Bn to be grounded when the load device 200 is the valid load, and the power supply controller 14 makes the bus negative terminal Bn not to be grounded when the load device 200 is the invalid load.

In the above-mentioned embodiments, the communication module 16 further includes a switch SWc. A control end of the switch SWc is coupled to the first pin Ec1, a first end of the switch SWc is grounded, and a second end of the switch SWc is coupled to the bus negative terminal Bn. The second pin Ec2 is coupled to the bus negative terminal Bn through the communication module 16. Therefore, the power supply controller 14 provides the second control signal Sc2 to turn on the switch SWc to make the bus negative terminal Bn be grounded when the load device 200 is the valid load. The power supply controller 14 provides the fourth control signal Sc4 to turn off the switch SWc to make the bus negative terminal Bn be not grounded when the load device 200 is the invalid load.

In particular, the power supply controller 14 determines whether the load device 200 is the valid load or the invalid load according to the Ethernet power supply specification (for example, but not limited to the IEEE 802.3 protocol standards). The power supply controller 14 provides the third control signal Sc3 through the bus negative terminal Bn and the negative end En to perform the handshaking communication with the load device 200. Therefore, the power supply controller 14 controls the Ethernet power supply 100 to provide the power required by the load device 200 according to the result of the handshaking communication. Therefore, when the load device 200 is the valid load and in the power supply phase, the power supplied to the load device 200 by the power supply controller 14 is defined in accordance with the Ethernet power supply specification.

In addition, the Ethernet power supply specification may also be defined by the user-customized valid load and invalid load, and may also be defined by the provided power range when the user customizes the valid load.

The first control unit 24 correspondingly provides the first valid control signal Se1 or a first invalid control signal Sn1 according to the terminal voltage Vc of the bus negative terminal Bn corresponding to the first control signal Sc1. The first control unit 24 provides the first valid control signal Se1 to the path control circuit 22 according to the first control signal Sc1 when the negative end En is connected to the bus negative terminal Bn and the bus negative terminal Bn has not been grounded (i.e., in the temporary connection phase) so that the path control circuit 22 is turned on to make the power supply controller 14 be powered on to work according to the first valid control signal Se1. The first control unit 24 provides the first invalid control signal Sn1 to the path control circuit 22 according to the first control signal Sc1 when the negative end En is connected to the bus negative terminal Bn and the bus negative terminal Bn is grounded (i.e., departing from the temporary connection phase). The first control unit 24 provides the first invalid control signal Sn1 to the path control circuit 22 according to the first control signal Sc1 when the negative end En is disconnected from the bus negative terminal Bn. Therefore, when the first control unit 24 provides the first valid control signal Se1 and the second control unit 26 provides the second invalid control signal Sn2, the path control circuit 22 is turned on to connect the coupling relationship between the power terminal 1-1 and the bus positive terminal Bp. In this condition, the power supply controller 14 is powered on to work but in the no-power supply phase. When the first control unit 24 provides the first invalid control signal Sn1 and the second control unit 26 provides the second valid control signal Se2, the path control circuit 22 is turned on to connect the coupling relationship between the power terminal 1-1 and the bus positive terminal Bp. In this condition, the power supply controller 14 is powered on to work and in the power supply phase. When the first control unit 24 provides the first invalid control signal Sn1 and the second control unit 26 provides the second invalid control signal Sn2, the path control circuit 22 is turned off to disconnect the coupling relationship between the power terminal 1-1 and the bus positive terminal Bp. In this condition, the power supply controller 14 is powered off to rest.

When the load device 200 is connected to the bus negative terminal Bn of the Ethernet power supply 100, a temporary loop is formed between the Ethernet power supply 100 and the load device 200 through the first port 100-1, the bus positive terminal Bp, the load device 200, and the bus negative terminal Bn so that a terminal voltage Vc of the bus negative terminal Bn is increased. Due the increase of the terminal voltage Vc, the first control unit 24 provides a first valid control signal Se1 to the switch unit 22 according to the temporary state of connecting the load device 200 to the Ethernet power supply 100. In this condition, since the power supply controller 14 is still powered off to rest, the second control unit 26 provides the second invalid control signal Sn2 to the switch unit 22. The switch unit 22 is turned on through the first valid control signal Se1 so that the power terminal 1-1 and the bus positive terminal Bp is electrically coupled. The power supply controller 14 receives the power supply voltage Vcc (or the DC voltage Vdc) to be powered on to work through the path control circuit 22, and therefore the power supply controller 14 starts to provide the first control signal Sc1 through the second pin Ec2 to communicate with the load device 200, thereby determining whether the load device 200 is the valid load or the invalid load.

When the power supply controller 14 communicates with the load device 200 through the third control signal Sc3 and determines that the load device 200 is the valid load, the power supply controller 14 provides the second control signal Sc2 (for example, but not limited to, a high-level signal) to the communication module 16 so as to control the communication module 16 to make the bus negative terminal Bn be grounded and make the power supply controller 14 be in the power supply phase. In the power supply phase, the power supply controller 14 provides the second control signal Sc2 to the second control unit 26. After the bus negative terminal Bn is grounded, the DC voltage Vdc is provided to the load device 200 through the bus positive terminal Bp and the bus negative terminal Bn to supply the required power to the load device 200. In this condition, since the bus negative terminal Bn is grounded to depart from the temporary connection phase to the power supply phase, the first control unit 24 provides the first invalid control signal Sn1 to the path control circuit 22. The second control unit 26 provides the second valid control signal Se2 to the path control circuit 22 according to the second control signal Sc2 provided from the first pin Ec1 so that the path control circuit 22 is continuously turned on according to the second valid control signal Se2.

The communication module 16 may be formed (constituted) by, for example, but not limited to, a switch SWc. When the third control signal Sc3 is provided from the second pin Ec2 of the communication terminal Ec, the power supply controller 14 provides the third control signal Sc3 to the bus negative terminal Bn. After the handshaking communication, the power supply controller 14 provides the second control signal Sc2 through the first pin Ec1 of the communication terminal Ec to turn on the switch SWc so that the bus negative terminal Bn is grounded through the switch SWc. Specifically, the second control signal Sc2 may be the high-level signal, and the signal level is sufficient to turn on the switch SWc. In addition, when the load device 200 is disconnected from the Ethernet power supply 100, the fourth control signal Sc4 provided from the first pin Ec1 of the communication terminal Ec turns off the switch SWc so that the bus negative terminal Bn is restored to the state where the load device 200 has not been connected yet.

Figure 3A:
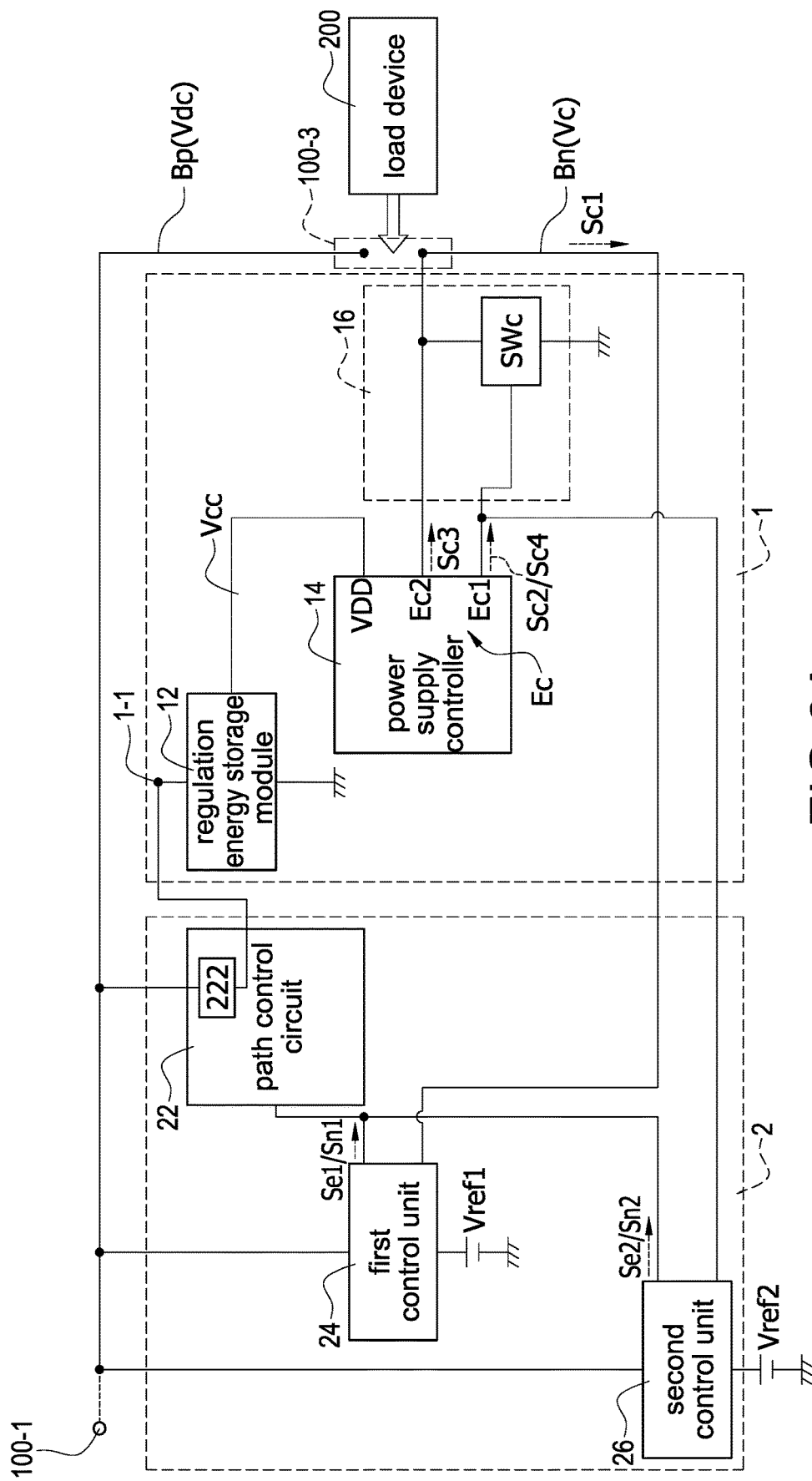
FIG. 3A is a block diagram of a second control module according to a first embodiment of the present disclosure.
Figure 3B:
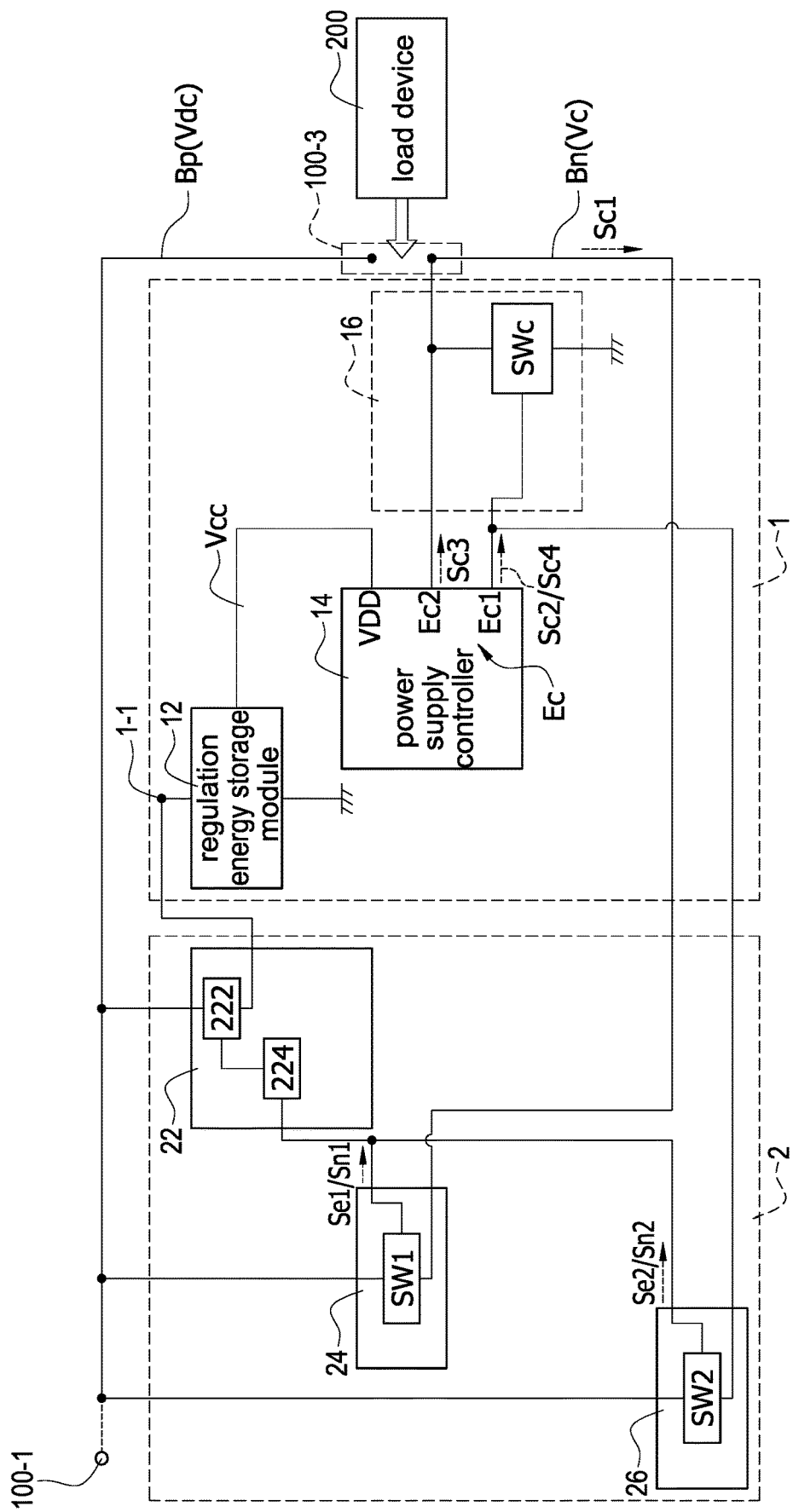
FIG. 3B is a block diagram of the second control module according to a second embodiment of the present disclosure.

Please refer to FIG. 3A, which shows a block diagram of a second control module according to a first embodiment of the present disclosure, FIG. 3B, which shows a block diagram of the second control module according to a second embodiment of the present disclosure, and also refer to FIG. 1 to FIG. 2. In FIG. 3A, the first control unit 24 and the second control unit 26 may be circuits with a potential comparison function. Take a circuit formed by a comparator as an example, the first control unit 24 is coupled to a first reference voltage Vref1, and the second control unit 26 is coupled to a second reference voltage Vref2. The first control unit 24 is used to compare a signal provided from the bus negative terminal Bn with the first reference voltage Vref1, and the first valid control signal Se1 is provided according to the comparison result so that the first valid control signal Se1 turns on the path control circuit 22. The second control unit 26 is used to compares a signal provided from the first pin Ec1 with the second reference voltage Vref2, and the second valid control signal Se2 is provided according to the comparison result so that the second valid control signal Se2 turns on the path control circuit 22. When a signal level of the signal provided from the bus negative terminal Bn is greater than the first reference voltage Vref1, the first valid control signal Se1 turns on the path control circuit 22; when a signal level of the signal provided from the first pin Ec1 is greater than the second reference voltage Vref2, the second valid control signal Se2 turns on the path control circuit 22.

In addition, the first control unit 24 further compares the first control signal Sc1 corresponding to the terminal voltage Vc of the bus negative terminal Bn with the first reference voltage Vref1 to provide the first valid control signal Se1. The second control unit 26 further compares the second control signal Sc2 provided from the first pin Ec1 with the second reference voltage Vref2 to provide the second valid control signal Se2.

In addition, the first control unit 24 further comprises the first control signal Sc1 corresponding to the terminal voltage Vc of the bus negative terminal Bn with the first reference voltage Vref1. When the first control signal Sc1 is greater than the first reference voltage Vref1, the first valid control signal Se1 is provided; when the first control signal Sc1 is lower than the first reference voltage Vref1, the first invalid control signal Sn1 is provided. The second control unit 26 further comprises the second control signal Sc2 provided from the first pin Ec1 with the second reference voltage Vref2. When the second control signal Sc2 is greater than the second reference voltage Vref2, the second valid control signal Se2 is provided; when the second control signal Sc2 is lower than the second reference voltage Vref2, the second invalid control signal Sn2 is provided.

When the second control signal Sc2 provided from the first pin Ec1 is lower than the second reference voltage Vref2 or the second control signal Sc2 is not provided, the second control unit 26 provides the second invalid control signal Sn2.

When the fourth control signal Sc4 provided from the first pin Ec1 is lower than the second reference voltage Vref2, the second control unit 26 provides the second invalid control signal Sn2.

In one embodiment, the path control circuit 22 includes a path switch 222. The path switch 222 may be composed of, for example, but not limited to, components with switch functions, such as MOSFET transistors and electronic components, such as resistors, capacitors, etc. Take the transistor as an example, a first end of the path switch 222 is coupled to the bus positive terminal Bp, and a second end of the path switch 222 is coupled to the power terminal 1-1. A control end of the path switch 222 is coupled to the first control unit 24 and the second control unit 26, and the path switch 222 is turned on or turned off by signals provided from the first control unit 24 and the second control unit 26. When one of the first control unit 24 and the second control unit 26 provides a valid control signal, the path switch 222 is turned on; when both the first control unit 24 and the second control unit 26 provide invalid control signals, the path switch 222 is turned off.

In FIG. 3B, the first control unit 24 and the second control unit 26 may be composed of, for example, but not limited to, components with switch functions, such as MOSFET transistors and electronic components, such as resistors, capacitors, etc. The first control unit 24 may be a switch circuit composed of a first switch component SW1, and the second control unit 26 may be a switch circuit composed of a second switch component SW2. The first switch component SW1 and the second switch component SW2 may be, for example, but not limited to, components having switch functions such as MOSFET transistors. When the first control unit 24 receives the first control signal Sc1 provided from the bus negative terminal Bn, the first switch component SW1 provides the first valid control signal Se1 to turn on the path control circuit 22 so as to connect the coupling relationship between the power terminal 1-1 and the bus positive terminal Bp. When the second control unit 26 receives the second control signal Sc2, the second switch component SW2 provides the second valid control signal Se2 to turn on the path control circuit 22 so as to connect the coupling relationship between the power terminal 1-1 and the bus positive terminal Bp.

In the implementation where the first switch component SW1 and the second switch component SW2 are transistors, the first control signal Sc1 corresponding to the terminal voltage Vc is used to drive a control end of the first switch component SW1 to turn on or turn off the first switch component SW1. The first control unit 24 correspondingly provides the first valid control signal Se1 or the first invalid control signal Sn1 according to the turned-on or turned-off first switch component SW1. The second control signal Sc2 provided from the first pin Ec1 is used to drive a control end of the second switch component SW2 to turn on or turn off the second switch component SW2. The second control unit 26 correspondingly provides the second valid control signal Se2 or the second invalid control signal Sn2 according to the turned-on or turned-off second switch component SW2.

In addition, the second control signal Sc2 and the fourth control signal Sc4 provided from the first pin Ec1 are used to drive the control end of the second switch component SW2 to correspondingly turn on and turn off the second switch component SW2 so that the second control unit 26 provides the second valid control signal Se2 according to the second control signal Sc2 and provides the second invalid control signal Sn2 according to the fourth control signal Sc4.

In one embodiment, when the first control unit 24 provides the first valid control signal Se1 or the second control unit 26 provides the second valid control signal Se2, the path switch 222 is turned on to connect the coupling relationship between the power terminal 1-1 and the bus positive terminal Bp. When the first control unit 24 provides the first invalid control signal Sn1 and simultaneously the second control unit 26 provides the second invalid control signal Sn2, the path switch 222 is turned off.

In one embodiment, the first control unit 24 can be turned on by the first control signal Sc1 due to the increased terminal voltage Vc of the bus negative terminal Bn.

In one embodiment, the path switch 222 further includes a drive switch 224. A first end of the drive switch 224 is coupled to the control end of the path switch 222, and a control end of the drive switch 224 is coupled to the first control unit 24 and the second control unit 26. The drive switch 224 is used to drive the path switch 222 turning on or turning off. Specifically, since the DC voltage Vdc received by the first port 100-1 may be a high voltage of 48 to 55 volts, the transistor of the path switch 222 needs to use p-MOSFET to withstand the DC voltage Vdc to avoid insufficient voltage withstand of the transistor (if a compliant n-MOSFET is used, the price will be too expensive). Therefore, the drive switch 224 is used to drive the path switch 222 so that the first port 100-1 and the power terminal 1-1 of the regulation energy storage module 12 can be successfully connected through the path switch 222. However, if the DC voltage Vdc is not high or the compliant n-MOSFET is suitable for use, the drive switch 224 may be omitted. Furthermore, if the DC voltage Vdc is above a specific voltage (for example, but not limited to, 30 volts), the path switch 222 and the drive switch 224 of FIG. 3B may preferably be used as the switch unit 22 to withstand the DC voltage Vdc. On the contrary, if the DC voltage Vdc is below the specific voltage, the single path switch 222 of FIG. 3A may preferably be used as the switch unit 22.

Figure 4:
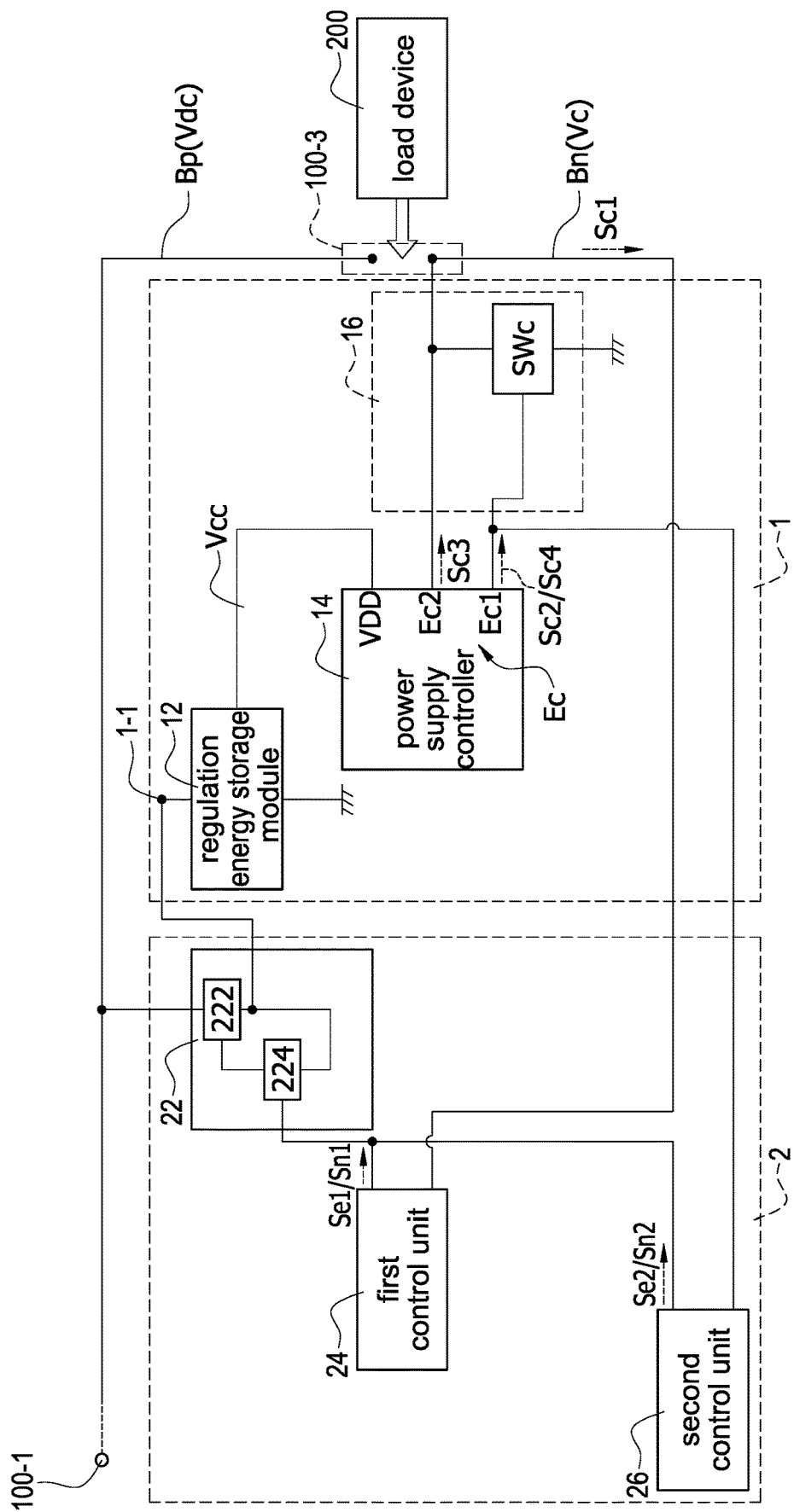
FIG. 4 is a block diagram of the second control module according to a third embodiment of the present disclosure.

Please refer to FIG. 4, which shows a block diagram of the second control module according to a third embodiment of the present disclosure, and also refer to FIG. 3B. In the third embodiment, the path control circuit 22 is a self-locking circuit. When the first control unit 24 provides the first valid control signal Se1, the path control circuit 22 is turned on to connect the coupling relationship between the power terminal 1-1 and the bus positive terminal Bp. In this condition, the first control unit 24 stops providing the first valid control signal Se1 so that the path control circuit 22 is still turned on. When the second control unit 26 provides the second invalid control signal Sn2, the path control circuit 22 is turned off to disconnect the coupling relationship between the power terminal 1-1 and the bus positive terminal Bp.

The first control unit 24 provides the first valid control signal Se1 to drive the path control circuit 22 from the turned-off state to the turned-on state. When the path control circuit 22 is turned on (in the turned-on state), the first control unit 24 stops or interrupts providing the first valid control signal Se1, which will not change the turned-on state of the path control circuit 22. The second control unit 26 provides the second invalid control signal Sn2 to drive the path control circuit 22 from the turned-on state to the turned-off state.

In one embodiment, a first end of the drive switch 224 is coupled to the control end of the path switch 222, and the control end of the drive switch 224 is coupled to the first control unit 24, the second control unit 26, and the path switch 222 so that the first control unit 24 and the path switch 222 are used to turn on the drive switch 224, and the second control unit 26 is used to turn off the drive switch 224. The drive switch 224 is further used to turn on or turn off the path switch 222. Therefore, when the first control unit 24 provides the first valid control signal Se1 to turn on the drive switch 224, the drive switch 224 is used to turn on the path switch 222 so that the path control circuit 22 is used to connect the coupling relationship between the power terminal 1-1 and the bus positive terminal Bp. When the path control circuit 22 maintains in the turned-on state and the first control unit 24 stops providing the first valid control signal Se1, the turned-on path switch 222 is used to turn on the drive switch 224 so that the path switch 222 and the drive switch 224 are continuously driven to each other to be turned on and lock the path control circuit 22 to be maintained in the turned-on state, thereby connecting the coupling relationship between the power terminal 1-1 and the bus positive terminal Bp. When the path control circuit 22 maintains in the turned-on state and the first control unit 24 stops providing the first valid control signal Se1, the second control unit 26 provides the second invalid control signal Sn2 to turn off the drive switch 224, and the turned-off drive switch 224 is used to turn off the path control circuit 22 so as to disconnect the coupling relationship between the power terminal 1-1 and the bus positive terminal Bp.

Figure 5:
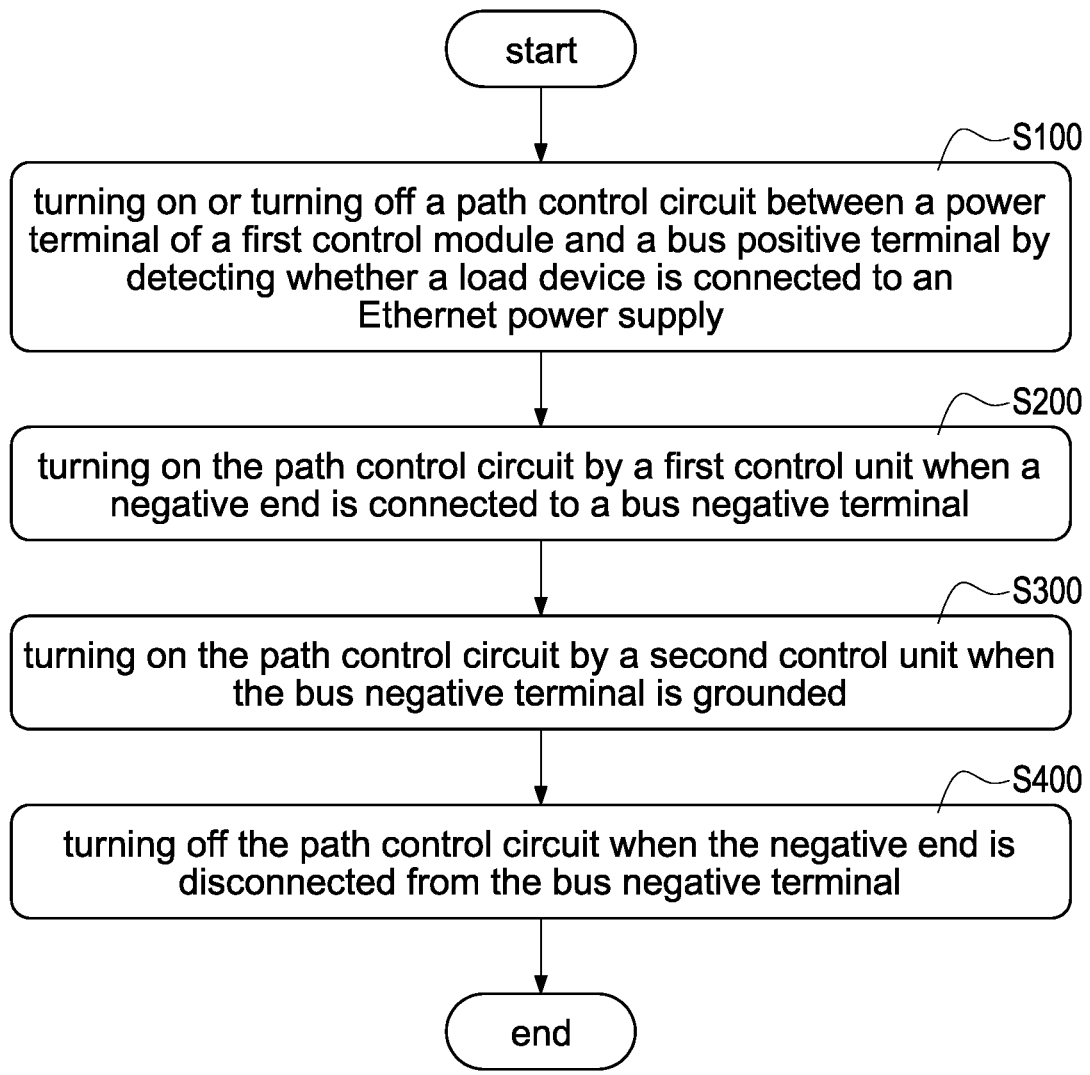
FIG. 5 is a flowchart of a power saving method of controlling the Ethernet power supply according to the present disclosure.

Please refer to FIG. 5, which shows a flowchart of a power saving method of controlling the Ethernet power supply according to the present disclosure, and also refer to FIG. 1 to FIG. 4. The power saving method is mainly used to control the first control module 1 to be powered off and stop working when the load device 200 is not connected to the Ethernet power supply 100 so as to save the power consumption of the Ethernet power supply 100. The power saving method includes the following steps. First, turning on or turning off the path control circuit between a power terminal of the first control module and the bus positive terminal by detecting whether the load device is connected to the Ethernet power supply (S100). The Ethernet power supply 100 detects whether the load device 200 is connected to the Ethernet power supply 100 so as to determine whether to supply power to the first control module 1 and make the first control module 1 operate. When the load device 200 is not connected (inserted) to the Ethernet power supply 100, the second control module 2 controls the first control module 1 to be powered off and stop working. When the load device 200 is connected (inserted) to the Ethernet power supply 100, the second control module 2 controls the first control module 1 being powered on to work. Afterward, turning on the path control circuit by the first control unit when the negative end is connected to the bus negative terminal (S200). In a preferred embodiment, when the load device 200 is connected to the bus negative terminal Bn of the Ethernet power supply 100, a temporary loop is formed between the Ethernet power supply 100 and the load device 200 so that a terminal voltage Vc of the bus negative terminal Bn is increased. Due the increase of the terminal voltage Vc, a first valid control signal Se1 is provided to the switch unit 22 according to the temporary state of connecting the load device 200 to the Ethernet power supply 100. The switch unit 22 is turned on through the first valid control signal Se1 so that the power terminal 1-1 and the bus positive terminal Bp is electrically coupled.

Afterward, turning on the path control circuit by a second control unit when the bus negative terminal is grounded (S300). In a preferred embodiment, since the bus negative terminal Bn is grounded to depart from the temporary connection phase to the power supply phase, the DC voltage Vdc is provided to the load device 200 through the bus positive terminal Bp and the bus negative terminal Bn to supply the required power to the load device 200. In this condition, since the bus negative terminal Bn is grounded to depart from the temporary connection phase to the power supply phase, the second control unit 26 provides the second valid control signal Se2 to the path control circuit 22 according to the second control signal Sc2 provided from a first pin Ec1 of the communication terminal Ec so that the path control circuit 22 is continuously turned on according to the second valid control signal Se2. Finally, turning off the path control circuit when the negative end is disconnected from the bus negative terminal (S400). In a preferred embodiment, when the load device 200 is disconnected from the Ethernet power supply 100, the terminal voltage Vc of the bus negative terminal Bn will change. The power supply controller 14 provides the fourth control signal Sc4 to the communication module 16 according to the change of the terminal voltage Vc of the bus negative terminal Bn. The first control unit 24 provides the first invalid control signal Sn1 to the path control circuit 22 according to the change of the terminal voltage Vc of the bus negative terminal Bn. The second control unit 26 provides the second invalid control signal Sn2 to the path control circuit 22 according to the fourth control signal Sc4. The path control circuit 22 turns off the path control circuit 22 according to the first invalid control signal Sn1 and the second invalid control signal Sn2.

In the above-mentioned embodiments, the specific circuit components included in each circuit and their coupling relationship are not limited. All implementations such as circuits and controllers (with internal software control) that can achieve the above-mentioned functions should be embraced within the scope of the present disclosure. In one embodiment, the detailed steps in FIG. 5 may refer to the content described in FIG. 2, and the detail description is omitted here for conciseness.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An Ethernet power supply coupled to a positive end and a negative end of a load device through a bus positive terminal and a bus negative terminal, and configured to receive a DC voltage, the Ethernet power supply comprising:
    a first control module, comprising a power terminal, and a first end of the first control module coupled to the bus negative terminal, and configured to control the power supplied by the Ethernet power supply to the load device, and
    a second control module, coupled to the first control module, the bus positive terminal, and the bus negative terminal, the second control module comprising:
    a path control circuit, configured to connect or disconnect a coupling relationship between the power terminal and the bus positive terminal,
    a first control unit, coupled to the bus negative terminal and the path control circuit, and configured to turn on the path control circuit according to a first control signal corresponding to a temporary connection phase when the negative end is connected to the bus negative terminal, and
    a second control unit, coupled to the first control module and the path control circuit, and configured to turn on the path control circuit according to a second control signal provided by the first control module,
    wherein the bus negative terminal provides the first control signal when the negative end is connected to or disconnected from the bus negative terminal; the first control module provides the second control signal; the second control module turns off the path control circuit when the negative end is disconnected from the bus negative terminal; the first control module is powered on to work when the path control circuit is turned on, and is powered off to rest when the path control circuit is turned off.

2. The Ethernet power supply as claimed in claim 1, wherein when the first control module is powered on to work to make the bus negative terminal be grounded to depart from the temporary connection phase, the DC voltage is provided to the load device through the bus positive terminal and the bus negative terminal.

3. The Ethernet power supply as claimed in claim 2, wherein the first control module provides the second control signal to make the bus negative terminal be grounded when the load device is confirmed as a valid load, and to make the bus negative terminal not be grounded when the load device is confirmed as an invalid load.

4. The Ethernet power supply as claimed in claim 3, wherein the first control signal is a terminal voltage of the bus negative terminal; the first control unit compares the first control signal with a first reference voltage, and turns on the path control circuit according to a comparison result of comparing the first control signal with the first reference voltage when the negative end is connected to the bus negative terminal; the second control unit compares the second control signal with a second reference voltage, and turns on the path control circuit according to a comparison result of comparing the second control signal with the second reference voltage when the load device is the valid load.

5. The Ethernet power supply as claimed in claim 4, wherein the first control module provides an additional control signal to make the bus negative terminal not be grounded when the load device is confirmed as the invalid load; the second control unit compares the additional control signal with the second reference voltage; the second control module turns off the path control circuit according to a comparison result of comparing the first control signal and the first reference voltage when the negative end is disconnected from the bus negative terminal; the second control module turns off the path control circuit according to a comparison result of comparing the additional control signal and the second reference voltage when the load device is the invalid load.

6. The Ethernet power supply as claimed in claim 3, wherein the second control unit compares the second control signal with a second reference voltage, and the second control unit turns on the path control circuit according to a comparison result of comparing the second control signal and the second reference voltage when the load device is the valid load.

7. The Ethernet power supply as claimed in claim 6, wherein the first control module provides an additional control signal to make the bus negative terminal not be grounded when the load device is confirmed as the invalid load; the second control unit compares the additional control signal with a second reference voltage; the second control unit turns off the path control circuit according to a comparison result of comparing the additional control signal and the second reference voltage when the load device is the invalid load.

8. The Ethernet power supply as claimed in claim 3, wherein the first control unit comprises a switch circuit having a first switch component; the first control signal is a terminal voltage of the bus negative terminal; the first switch component is turned on by the first control signal when the load device is connected and in the temporary connection phase; the second control module turns on the path control circuit when the first switch component is turned on.

9. The Ethernet power supply as claimed in claim 3, wherein the second control unit comprises a switch circuit having a second switch component; the second switch component is turned on by receiving the second control signal; the second control module turns on the path control circuit due to the turned-on second switch component.

10. The Ethernet power supply as claimed in claim 9, wherein the first control module provides an additional control signal to make the bus negative terminal not be grounded when the load device is confirmed as the invalid load; the second switch component is turned off by the additional control signal; the second control module turns off the path control circuit according to the first control signal when the negative end is disconnected from the bus negative terminal and the second switch component is turned off.

11. The Ethernet power supply as claimed in claim 3, wherein the first control module comprises:
   a power supply controller, coupled to the path control circuit and the second control module, and when the path control circuit is turned on, the power supply controller configured to receive the DC voltage to be powered on to work to provide the second control signal, and
   a communication module, coupled to the power supply controller and the bus negative terminal, and configured to provide a third control signal to the bus negative terminal to perform a handshaking mechanism.

12. The Ethernet power supply as claimed in claim 11, wherein the power supply controller transmits the third control signal to the bus negative terminal to perform the handshaking mechanism through the communication module, provides the second control signal to control the communication module to make the bus negative terminal be grounded when the load device is confirmed as the valid load, and provides an additional control signal when the load device is confirmed as the invalid load or the negative end is disconnected from the bus negative terminal.

13. The Ethernet power supply as claimed in claim 12, wherein the first control signal is a terminal voltage of the bus negative terminal, and the path control circuit is turned on by the first control unit according to the first control signal when the negative end is connected to the bus negative terminal;
   wherein the second control module turns on the path control circuit by the first control unit according to the first control signal corresponding to a temporary connection phase, or by the second control unit according to the second control signal when the load device is the valid load;
   wherein the second control module turns off the path control circuit by the first control unit according to the first control signal corresponding to departing from the temporary connection phase, and by the second control unit according to the additional control signal when the load device is the invalid load.

14. The Ethernet power supply as claimed in claim 3, wherein the path control circuit comprises:
   a path switch, a first end of the path switch coupled to the bus positive terminal and a second end of the path switch coupled to the power terminal, and
   a drive switch, a first end of the drive switch coupled to a control end of the path switch, and a control end of the drive switch coupled to the first control unit and the second control unit,
   wherein the first control unit and the second control unit are configured to turn on or turn off the path switch, and the drive switch is configured to turn on or turn off the path switch; the drive switch is turned on by the first control unit according to the first control signal when the first control unit is in the temporary connection phase or is turned on by the second control unit according to the second control signal, and the turned-on drive switch turns on the path switch to connect the coupling relationship between the power terminal and the bus positive terminal;
   wherein the first control unit and the second control unit of the second control module turn off the drive switch when the negative end is disconnected from the bus negative terminal, and the turned-off drive switch turns off the path switch to disconnect the coupling relationship between the power terminal and the bus positive terminal.

15. An Ethernet power supply coupled to a positive end and a negative end of a load device through a bus positive terminal and a bus negative terminal, and configured to receive a DC voltage, the Ethernet power supply comprising:
   a first control module, comprising a power terminal, and a first end of the first control module coupled to the bus negative terminal, and configured to control the power supplied by the Ethernet power supply to the load device, and
   a second control module, coupled to the first control module, the bus positive terminal, and the bus negative terminal, the second control module comprising:
   a path control circuit, configured to connect or disconnect a coupling relationship between the power terminal and the bus positive terminal,
   a first control unit, coupled to the bus negative terminal and the path control circuit, and configured to provide a first valid control signal to drive the path control circuit from a turned-off state to a turned-on state when the negative end is connected to the bus negative terminal, and the first control module be correspondingly powered on to work, and
   a second control unit, coupled to the first control module and the path control circuit, and configured to provide an invalid control signal to drive the path control circuit from the turned-on state to the turned-off state when the negative end is disconnected from the bus negative terminal, and the first control module be correspondingly powered off to rest,
   wherein when the first control module is powered on to work, the first control module controls the second control unit to provide the invalid control signal when the negative end is disconnected from the bus negative terminal.

16. The Ethernet power supply as claimed in claim 15, wherein the path control circuit comprises:
   a path switch, a first end of the path switch coupled to the bus positive terminal and a second end of the path switch coupled to the power terminal, and a drive switch, a first end of the drive switch coupled to a control end of the path switch, and a control end of the drive switch coupled to the first control unit, the second control unit, and the path switch, wherein the first valid control signal turns on the drive switch to turn on the path switch, and the turned-on path switch makes the drive switch in a turned-on state and continuously connect the coupling relationship between the power terminal and the bus positive terminal, wherein the invalid control signal turns off the drive switch to turn off the path switch, and the turned-off path switch makes the drive switch in a turned-off state and continuously disconnect the coupling relationship between the power terminal and the bus positive terminal.

17. A power saving method of controlling an Ethernet power supply, the Ethernet power supply configured to receive a DC voltage, and coupled to a positive end and a negative end of a load device; the Ethernet power supply comprising a first control module, and the first control module configured to receive the DC voltage through a bus positive terminal and a bus negative terminal, and the first control module coupled to the negative end through the bus negative terminal and configured to provide a first control signal through the bus negative terminal to confirm whether the load device is a valid load; the power saving method comprising steps of:

turning on or turning off a path control circuit between a power terminal of the first control module and the bus positive terminal by detecting whether the load device is connected to the Ethernet power supply, turning on the path control circuit by a first control unit when the negative end is connected to the bus negative terminal, turning on the path control circuit by a second control unit when the bus negative terminal is grounded, and turning off the path control circuit when the negative end is disconnected from the bus negative terminal.

18. The power saving method as claimed in claim 17, further comprising steps of:

providing a first valid control signal by the first control unit when a terminal voltage of the bus negative terminal is increased, providing an invalid control signal by the second control unit when the first control module is powered off to stop working, and turning on the path control circuit by the first valid control signal and the invalid control signal.

19. The power saving method as claimed in claim 18, wherein the first control module is powered on to work when the path control circuit is turned on, and the first control module provides the first control signal to confirm whether the load device is the valid load.

20. The power saving method as claimed in claim 18, wherein the first control module provides a second control signal to make the bus negative terminal be grounded when the first control module is completed in communication, and the power saving method further comprises steps of:

providing a first invalid control signal by the first control unit when the bus negative terminal is grounded, providing a second valid control signal by the second control unit according to the second control signal, and turning on the path control circuit by the first invalid control signal and the second valid control signal.

21. The power saving method as claimed in claim 18, wherein the first control module provides an additional control signal when the negative end is disconnected from the bus negative terminal, and the power saving method further comprises steps of:

providing a first invalid control signal by the first control unit when a terminal voltage of the bus negative terminal is at a first level, providing the invalid control signal by the second control unit according to the additional control signal, and turning off the path control circuit by the first invalid control signal and the invalid control signal.

22. The power saving method as claimed in claim 18, wherein when the first control module confirms that the load device is the valid load, the first control module provides a second control signal to control a communication module to make the bus negative terminal be grounded, and controls the Ethernet power supply to provide an implied power to the load device.

* * * * *